United States Patent

Lee et al.

(10) Patent No.: US 7,659,346 B2
(45) Date of Patent: Feb. 9, 2010

(54) PROCESS FOR MALEATING POLYMERIZATION RESIDUES AND PRODUCTS

(75) Inventors: Chun D. Lee, Cincinnati, OH (US); Jeffrey A. Jones, Morrow, OH (US)

(73) Assignee: Equistar Chemicals, LP, Houston, TX (US)

( * ) Notice: Subject to any disclaimer, the term of this patent is extended or adjusted under 35 U.S.C. 154(b) by 498 days.

(21) Appl. No.: 11/528,411

(22) Filed: Sep. 27, 2006

(65) Prior Publication Data

US 2008/0076875 A1 Mar. 27, 2008

(51) Int. Cl.
*C08L 51/06* (2006.01)
(52) U.S. Cl. ...................... 525/242; 525/285
(58) Field of Classification Search ................. 525/242, 525/285
See application file for complete search history.

(56) References Cited

U.S. PATENT DOCUMENTS

| 4,039,560 | A | * | 8/1977 | Tomoshige | ................. 549/237 |
| 4,071,581 | A | * | 1/1978 | Yokoyama | ................. 525/285 |
| 4,357,448 | A | | 11/1982 | Tsubaki et al. | |
| 5,236,998 | A | | 8/1993 | Lundeen et al. | |
| 5,498,809 | A | * | 3/1996 | Emert et al. | ................. 585/13 |
| 5,883,196 | A | * | 3/1999 | Rath et al. | ................. 525/285 |
| 6,770,715 | B2 | | 8/2004 | Garrison et al. | |
| 2003/0078357 | A1 | * | 4/2003 | Lai et al. | ................. 526/335 |
| 2003/0120004 | A1 | * | 6/2003 | Lai et al. | ................. 526/126 |
| 2003/0228479 | A1 | * | 12/2003 | Shelby et al. | ................. 428/480 |

* cited by examiner

*Primary Examiner*—Jeffrey C Mullis
(74) *Attorney, Agent, or Firm*—Gerald A. Baracka; Jonathan L. Schuchardt

(57) ABSTRACT

A process for converting distillation residues obtained from polymerization processes to useful maleated products is provided.

12 Claims, No Drawings

PROCESS FOR MALEATING POLYMERIZATION RESIDUES AND PRODUCTS

BACKGROUND OF THE INVENTION

1. Field of the Invention

The invention relates to a process for converting distillation resides obtained from polymerization processes to useful products. More specifically, the process is directed to the maleation of distillation residues to produce maleated products characterized by having viscosities which are shear dependent.

2. Description of the Prior Art

High density polyethylene (HDPE) resins are widely utilized for film applications such as for grocery sacks, merchandise bags, can liners and the like. HDPEs are typically produced by copolymerizing ethylene with a minor amount of a $C_{3-8}$ α-olefin comonomer using either Ziegler-Natta catalysts or the so-called Phillips catalysts. The latter are chromium oxide catalysts and generally produce HDPE resins having broad molecular weight distributions (MWDs) whereas Ziegler-Natta catalysts, which are based on transition metal technology, produce narrower MWD HDPEs.

While most HDPEs exhibit good tensile and stiffness properties, certain improvements, such as increased tear properties and increased impact strength, can be achieved by increasing the molecular weight of the resin. High molecular weight resins are, however, more difficult to process for film production and require the use of higher processing temperatures and/or pressures. To ameliorate this effect, high molecular weight high density polyethylene (HMW HDPE) film grade resins preferably have broad MWDs.

Multiple-stage polymerization technologies wherein polymers of different molecular weights are produced in separate reactors and blended to produce a final resin product are a known means of producing resins having broadened MWDs (see e.g., U.S. Pat. No. 5,236,998)

U.S. Pat. No. 4,357,448 discloses a process wherein ethylene or a mixture of ethylene and a small amount of another α-olefin are polymerized in two successive steps under different hydrogen partial pressures using high activity Ziegler-type catalysts to produce HDPE resins having broad MWDs. A similar procedure for the production of high molecular weight medium density polyethylene resins is disclosed in U.S. Pat. No. 6,770,715.

In one mode of operation for the production of HMW HDPEs where successive polymerization steps are employed, ethylene is homopolymerized in a first reactor in a hydrocarbon diluent, such as hexane or heptane, and the amount of molecular weight regulator, i.e., hydrogen, is maintained at low levels to maximize molecular weight of the homopolymer formed. The high molecular weight homopolymer produced in the first reaction zone is then fed along with the solvent and catalyst to a second reaction zone where ethylene and a $C_{3-8}$ α-olefin comonomer are copolymerized in the presence of the homopolymer. The ratio of homopolymer produced in the first reactor to copolymer produced in the second reactor (which typically has a lower molecular weight) is selected to provide the desired average molecular weight and MWD in the final resin product for optimal physical properties and processing characteristics.

While such processes are an effective and versatile means for producing a broad array of HMW HDPE resins of varying densities and melt indexes (MIs), substantial amounts of low molecular weight polymers (LMWPs) are also formed. The LMWPs have number average molecular weights ($M_n$) from several hundred up to about 30000 and, more typically, up to about 20000. These low molecular weight by-product polymers have a waxy character and they remain in the hydrocarbon diluent after separation and recovery of the HMW HDPE by centrifugation or other suitable means.

In a typical HMW HDPE operation, the hydrocarbon diluent containing the LMWP, any unrecovered HMW HDPE and catalyst residue is subjected to one or more distillations to recover the hydrocarbon which is recycled for reuse in the polymerization process. The still "bottoms" obtained from the distillation, also referred to herein as the polymerizer/polymerization residue or by-product, generally contain about 60 to 90 weight percent (wt. %) LMWP, 5 to 20 wt. % HMW HDPE, 4 to 10 wt. % hydrocarbon diluent and 0.2 to 1 wt. % catalyst residue and catalyst deactivating agents, e.g., alcohols.

Even though the low molecular weight ethylene polymer waxes are the major constituents, these polymerizer residues cannot be used as such for most wax applications due to the presence of significant levels of the high molecular species (which increase the viscosity to a level outside the useful range for most wax applications) and their high metals content due to the presence of catalyst residues (which form undesirable color bodies).

Since separation of the low and high molecular weight species and removal of catalyst residues is difficult and not economically feasible, it would be highly desirable if a process were available whereby the polymerization residues recovered from such processes could be effectively treated and converted into useful products. These and other advantages are achieved with the process of the present invention which is described in detail to follow.

SUMMARY OF THE INVENTION

The invention relates to a process for maleating by-products recovered from HMW HDPE polymerizations. In addition to converting by-products to useful products the maleated wax products produced by the process exhibit unexpected viscosity characteristics.

The process of the invention comprises treating a distillation residue obtained from a HMW HDPE polymerization processing containing 4 to 10 weight percent hydrocarbon diluent, 5 to 20 weight percent high molecular weight high density polyethylene, 60 to 90 weight percent low molecular weight polyethylene waxes and 0.2 to 1 weight percent catalyst residue to remove substantially all of the hydrocarbon diluent incorporating 1 to 10 weight percent maleic anhydride, based on the weight of the distillation residue; incorporating 0.25 to 6 weight percent organic peroxide, based on the weight of the distillation residue; heating the mixture above the decomposition temperature of the organic peroxide until substantially all of the maleic anhydride is reacted; and recovering the maleated product. Products produced by the maleation process contain from 0.5 to 7 weight percent reacted maleic anhydride and have a viscosity which is essentially shear independent.

In a preferred mode of operation, the maleation is conducted by (a) heating the distillation residue at a temperature of 120° C. to 150° C. to remove substantially all of the hydrocarbon diluent; (b) maintaining the essentially hydrocarbon diluent-free residue obtained from (a) in a molten state and incorporating from 1 to 10 weight percent maleic anhydride; (c) incorporating 0.25 to 6 weight percent organic peroxide into the melt containing the maleic anhydride from (b) while maintaining the temperature of said melt below the decomposition temperature of the organic peroxide; (d)

increasing the temperature of the mixture from (c) above the decomposition temperature of the organic peroxide and maintaining until substantially all of the maleic anhydride is reacted; and (e) recovering the maleated product.

DETAILED DESCRIPTION OF THE INVENTION

The present process is directed to a method of utilizing by-products obtained from processes wherein ethylene is polymerized using Ziegler-Natta catalysts in a hydrocarbon medium. More specifically, it relates to a process wherein distillation residues obtained from multi-stage HMW HDPE polymerizations are maleated to produce useful products. The by-products treated in accordance with the process of the invention are comprised of about 60 to 90 wt. % LMWPs, about 5 to 20 wt. % HMW HDPE, about 4 to 10 wt. % hydrocarbon diluent and about 0.2 to 1 wt. % catalyst residue. Catalyst residues include metal complexes, salts, etc., formed during polymerization or as a result of catalyst deactivation procedures prior to distillation, e.g., by the addition of alcohols or ketones to "kill" the catalyst. Octanol is commonly used to deactivate the catalyst in these types of polymerizations. If this is the case, the residue may contain up to about 500 ppm residual octanol. The amount of catalyst residue is determined utilizing known x-ray fluorescence (XRF) procedures.

The distillation by-products utilized for the process of the invention are residues obtained from processes wherein a first ethylene polymer (homopolymer or copolymer) is produced in a first polymerization zone and a second ethylene-α-olefin copolymer resin is produced in a second polymerization zone in the presence of the first ethylene polymer. The first and second polymers are produced in the desired ratio to obtain a final HMW HDPE resin product. The polymerizations are conducted in an inert hydrocarbon medium in separate reactors connected in series using Ziegler-Natta catalysts. Polymer produced in the first reactor is fed into the second reactor with the catalyst, solvent and unreacted ethylene where comonomer and additional ethylene are added. Such two-stage processes are known and described in U.S. Pat. No. 4,357,448 details of which are incorporated herein by reference.

Typically, the amount of comonomer present in the first reactor is very low and, in commercial operations, is the result of the introduction of recycled gases and hydrocarbon diluent which can contain comonomer.

The polymerizations are carried out in an inert hydrocarbon medium using conventional Ziegler-type catalysts. Typically, the same catalyst is used for both polymerizations; however, this is not necessary. It may be desirable to add additional catalyst to the second reactor and this catalyst may be the same or different than the catalyst employed in the first reactor. Inert hydrocarbons which can be used for the process include saturated aliphatic hydrocarbons such as hexane, isohexane, heptane, isobutane and mixtures thereof. Catalysts are typically metered into the reactors dispersed in the same hydrocarbon used as the polymerization medium. Hydrogen may be included in either or both of the reactors to regulate molecular weight.

In one highly useful mode of operation, higher density, higher MI polymer, predominantly ethylene homopolymer, is produced in the first reactor and lower density, lower MI ethylene/butene-1, ethylene/hexene-1 or ethylene/octene-1 copolymer is produced in the second reactor. To accomplish this, hydrogen to ethylene mole ratios from 1 to 10 are employed in the first reactor whereas hydrogen to ethylene mole ratios from 0.01 to 1 are employed in the second reactor.

When operating in series mode, it may be necessary to vent hydrogen prior to transferring the first polymer in order to achieve the desired hydrogen:ethylene ratio in the second reactor. This can be readily accomplished by means of a flash tank installed between the two reactors.

MI and density of the first polymer produced in the first reactor will be in the range 1 to 1000 g/10 min and 0.955 to 0.975 g/cm$^3$, respectively, whereas MI and density of the second copolymer produced in the second reactor will be in the range 0.001 to 10 g/10 min and 0.915 to 0.940 g/cm$^3$, respectively. In a particularly advantageous embodiment of the invention copolymer produced in the second reactor will have a density of 0.925 to 0.938 g/cm$^3$ and MI from 0.01 to 5 g/10 min.

Polymerizations in the first and second reactors are generally carried out at pressures up to 300 psi and temperatures up to 100° C. Polymerization temperatures are most typically maintained at 60° C. to 95° C. and, more preferably, between 65° C. and 85° C. Pressures are most generally maintained between 80 psi and 200 psi and, more preferably, from 80 psi to 160 psi when using hexane(s) as the polymerization medium.

Properties of the final HMW HDPE resin product will vary depending on the properties of the first polymer and second copolymer products produced in the respective reactors and the ratio of first polymer and second copolymer resin components, i.e., composition ratio. The final HMW HDPE resin will, however, generally have a density of 0.940 to 0.955 g/cm$^3$ and MI from 0.01 to 0.5 g/10 min. Densities of the HMW HDPE resins produced by the process are preferably in the range 0.945 to 0.952 g/cm$^3$ and MIs are preferably in the range 0.02 to 0.3 g/10 min. Densities and MIs referred to herein are determined in accordance with ASTM D 1505 and ASTM D 1238-01, condition 190/2.16, respectively. The HMW HDPE resins generally have MWDs ($M_w/M_n$) in the range 20 to 30.

High activity Ziegler-Natta catalyst systems employed for the polymerizations comprise a solid transition metal-containing catalyst component and organoaluminum co-catalyst component. The solid transition metal-containing catalyst component is obtained by reacting a titanium or vanadium halogen-containing compound with a reaction product obtained by reacting a Grignard reagent with a hydropolysiloxane having the formula $$R_a H_b SiO_{\frac{4-a-b}{2}}$$

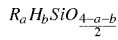

wherein R represents an alkyl, aryl, aralkyl, alkoxy, or aryloxy group as a monovalent organic group; a is 0, 1 or 2; b is 1, 2 or 3; and a+b<3) or a silicon compound containing an organic group and hydroxyl group in the presence or absence of an aluminum-alkoxide, aluminum alkoxy-halide halide or a reaction product obtained by reacting the aluminum compound with water.

Organoaluminum co-catalysts correspond to the general formula $$AlR^1_n X_{3-n}$$

wherein $R^1$ is a $C_1$-$C_8$ hydrocarbon group; X is a halogen or an alkoxy group; and n is 1, 2 or 3. Useful organoaluminum compounds of the above type include triethylaluminum, tributylaluminum, diethylaluminum chloride, dibutylaluminum chloride, ethylaluminum sesquichloride, diethylaluminum hydride, diethylaluminum ethoxide and the like.

High activity catalyst systems of the above types which can be employed are known and are described in detail in U.S. Pat. No. 4,357,448, which is incorporated herein by reference.

The HMW HDPE polymer is typically recovered from the hydrocarbon diluent by centrifugation although other means, such as the use of Zig-Zag separators, may also be employed to separate the polymer particles from the hydrocarbon medium. Although the bulk of the high molecular weight resin is recovered, a small amount remains with the hydrocarbon. Substantial amounts of LMWP formed during the polymerization are also present in the hydrocarbon diluent as are catalyst and any modifiers which may have been used for the polymerization.

The hydrocarbon diluent containing the above components, the amounts of which will vary depending on the mode of recovery used and other operational variables, is subsequently distilled to remove/recover the hydrocarbon which is recycled for use in the process. Since in the preferred mode of operation, it is customary to deactivate or "kill" any catalyst present in the hydrocarbon prior to distillation, e.g., by the addition of alcohols or ketones, species formed as a result of this procedure as well as any residual deactivating agent (alcohol or ketone) will also be present in the hydrocarbon diluent being distilled. Distillation can be accomplished in a single distillation column but, more typically, multiple stills are employed. Typically the recovered hydrocarbon is purified and recycled to the first polymerization reactor; however, the recycle stream may be split and introduced at several points in polymerization sequence.

The distillation residue, i.e., the still bottoms remaining when distillation is complete, are maleated in accordance with the process of the invention. These residues will typically contain a small amount of residual hydrocarbon (usually about 4 to 10 wt. %), some unrecovered HMW HDPE polymer (usually about 5 to 20 wt. %) and 0.2 to 1 wt. % catalyst residue. The latter are various metal species, i.e., complexes and salts, formed during polymerization and upon treatment with the deactivating agent. Small amounts of deactivating agents, typically less than 500 ppm, may also be present. The bulk of the distillation residue, however, consists of low molecular weight polymers produced during the polymerization. These LMWPs, which have molecular weights in the range generally associated with polyethylene waxes, comprise about 60 to 90 wt. % of the residue. Molecular weights of the low molecular weight waxy materials range from about 100 up to about 30000 and, more typically, are in the range 100 to 20000. Molecular weights referred to herein are number average molecular weights ($M_n$).

The distillation residues are maleated, i.e., reacted with maleic anhydride, in accordance with the process of the invention to obtain useful maleated products. The maleated products containing both low and high molecular weight ethylene polymer species possess unique viscosity characteristics rendering them useful for a variety of applications but particularly as compatibilizing/coupling agents for composites.

For the maleation process, the distillation residue is first treated to remove substantially all of the remaining hydrocarbon. This can be conveniently accomplished utilizing known devolatilization procedures wherein the residue is heated above the boiling point of the hydrocarbon. Removal of volatiles, i.e., the hydrocarbon, is generally further facilitated by sweeping an inert gas over and/or through the product, pulling a vacuum on the system or by similar means. Commercial evaporators/devolatilizers are known for these procedures. The temperature used for the devolatilization will vary depending on the hydrocarbon. When the hydrocarbon is hexane, widely used as a diluent for polymerization processes of the type described above to produce HMW HDPE, temperatures in the range 120° C. to 150° C. will generally be used for the devolatilization step. Excessive heat should be avoided to minimize polymer degradation. The devolatized residue should be substantially hydrocarbon free, i.e., contain less than about 200 ppm hydrocarbon and, more preferably, less than 50 ppm hydrocarbon.

The substantially hydrocarbon free residue may be stored at this point or, as is more usually the case, passed directly to the next step in the process where maleic anhydride is added and incorporated. Any means suitable to uniformly distribute the maleic anhydride in the devolatilized residue can be employed. This can be accomplished in a suitable blender/mixer or in an extruder with a suitable mixing chamber. The maleic anhydride can be dry blended with the residue, such as in the case where it has been stored after devolatilization; however, maleic anhydride incorporation is preferably carried out in the melt state, i.e., the maleic anhydride is added to and uniformly mixed into molten devolatized residue. Temperature of the melt is preferably the same as that employed for the devolatization step. The amount of maleic anhydride incorporated will range from 1 to 10 wt. % and, more preferably, is from 1.5 to 8 wt. %.

After incorporating the maleic anhydride, 0.25 to 6 wt. % and, more preferably, 0.5 to 5 wt. % of an organic peroxide is added to the molten mixture. The peroxide is preferably added at a temperature below its decomposition temperature and this temperature maintained until the peroxide is uniformly distributed throughout the mixture. At that point the temperature is raised above the decomposition temperature of the organic peroxide and maintained until substantially all of the maleic anhydride is reacted. The maleated product will contain from 0.5 to 7 wt. % and, more preferably, from 1 to 5 wt. % bound maleic anhydride. The extent of reaction, i.e., grafting, is determined using known Fourier transform infrared spectroscopic (FTIR) techniques.

Organic peroxides and hydroperoxides which decompose at temperatures below the melting point of the mixture can be used. Suitable organic peroxides include dicumyl peroxide, dibenzoyl peroxide, di-t-butyl peroxide, t-butylperoxybenzoate, 2,5-dimethyl-2,5-di(t-butylperoxy)hexane, t-butyl peroxyneodecanoate, 2,5-dimethyl-2,5-di(t-butylperoxy) hexyne, t-amyl peroxypivalate, 1,3-bis(t-butylperoxyisopropyl)benzene, and the like. Hydroperoxides can include di-t-butyl hydroperoxide, t-butyl hydroperoxide and the like.

The reaction step can conveniently be carried out in the same equipment used for the devolatilization and/or maleic anhydride incorporation steps, e.g., using an extruder having a mixing zone suitable for incorporating the maleic anhydride followed by one or more reaction zones where maleation can occur. Such extruders would have suitable screw designs and temperature profiles and be appropriately configured. Other equipment such as that manufactured by LIST USA INC. which incorporates a devolatilizer with a kneader reactor could also be employed to perform all three steps of the process in one continuous operation.

Temperatures between about 130° C. to 200° C. and, more preferably, from about 140° C. to 180° C. are employed for the reaction step. Reaction times will vary depending on the reaction conditions and the particular organic peroxide used. Conditions should be such that substantially all of the maleic anhydride is reacted. For batch operations reaction times typically range from 3 minutes to 1 hour and, more preferably, from about 10 to 40 minutes. For continuous operations, such as where the reaction is carried out in an extruder with highly efficient mixing and capable of operating at relatively high temperatures, residence times can vary from 0.5 to 5 minutes.

Maleated products of the invention can be utilized in most application where functionalized ethylene polymers have been used. They are, however, particularly advantageous as compatibilizing/coupling agents for wood-plastic composites (WPCs). Use of cellulosic-reinforced plastic composites has grown in recent years as consumers discover the advantages of these products compared to wood. WPCs are increasingly being utilized for installations in environments which are unfavorable to the use of wood, e.g., where cracking, warping, rotting or attack by insects would typically be expected.

Numerous plastic resins including HDPE, PVC, EVA, ABS and polystyrene can be used with various cellulosic fillers for the production of useful WPCs. The amount of cellulosic filler used will vary depending on the particular resin and filler being used and the intended application. In general, however, about 40 to 60% cellulosic filler is utilized for extruded profiles whereas lower filler loadings, on the order of 20 to 30%, are used for molded pieces.

The maleated products of the invention are particularly useful for composites comprised of 35 to 85 wt. % and, more preferably, 40 to 80 wt. % matrix polymer and 15 to 65 wt. % and, more preferably, 20 to 60 wt. % cellulosic filler. The maleated distillation residues produced in accordance with the process of the invention are utilized at levels of 0.5 to 20 wt. % and, more preferably, from 1 to 10 wt. % to facilitate processing, incorporation and binding of cellulosic filler materials.

Useful cellulosic materials can be any of the known products available from a variety of natural sources or as by-products from various processes. These can include such diverse materials as paper, cardboard, wheat pulp, rice hulls, coconut shells, peanut shells, corn cobs, sawdust, wood chips, wood fiber, wood flakes, wood flour, ground wood, palm fiber, bamboo fiber, bagasse, jute, flax and the like. Of these, wood fillers are particularly useful.

In one highly useful embodiment, the cellulosic filler is a wood flour. Wood flours are widely available materials produced by pulverizing various wood residues obtained from commercial operations, e.g., sawdust, using hammer mills or other suitable equipment to reduce particle size. Wood flours are typically classified based on the size of screen mesh through which the material will pass and 30 to 150 mesh materials are most commonly used.

In another highly useful embodiment, the matrix polymer is HDPE or a mixture comprised of a majority of HDPE and one or more other polyolefins, preferably polyethylene, resins. Reclaim/recycled resins may also be included in the composites. HDPEs and HDPE mixtures employed for these applications generally have densities from 0.940 to 0.970 g/cm$^3$ and, more preferably, from 0.945 to 0.965 g/cm$^3$.

To demonstrate the maleation process of the invention, the following experiment was conducted using a distillation residue obtained from a commercial two-stage HMW HDPE polymerization process wherein ethylene-butene-1 copolymer was produced in hexane using a high activity titanium catalyst and organoaluminum co-catalyst. As part of the operation, hexane coming off of the centrifuges used to recover the HMW HDPE was treated with octanol to deactivate the catalyst and then distilled and purified for recycle in the process. Residue, i.e., still bottoms, recovered from this distillation was employed for the example. The solid wax distillation residue contained 8 wt. % hexane, 0.5 wt. % catalyst residues, 6 wt. % HMW HDPE and 85.5 wt. % low molecular weight polyethylene polymers ($M_n$ less than 30,000) and trace amounts (less than 400 ppm) octanol.

The solid wax residue was transferred to a glass reaction vessel and heated to 120° C. under a blanket of flowing nitrogen with stirring (340 rpm) for approximately 30 minutes to remove the hexane. After completion of this devolatilization step, the amount of residual hexane was less than 0.01 wt. %.

The temperature of the molten mixture was then increased to 140° C. and 3 wt. % maleic anhydride added while continuing the stirring. After the maleic anhydride was uniformly dispersed throughout the molten mixture, 3 wt. % dibenzoyl peroxide was added and the mixture reacted for 20 minutes at 140° C. with stirring. After cooling the product was ground.

Analysis of the product by FTIR showed it to contain 1.8 wt. % bound maleic anhydride and to be substantially free of unreacted peroxide and unreacted maleic anhydride. The maleated product had a waxy appearance and two DSC melting peaks (at 82.0° C. and 115.8° C.). The Brookfield viscosity at 150° C. (20 rpm) was 1300 cP.

Additionally, the maleated product obtained from the above-described procedure exhibited unexpected and highly desirable viscometric behavior under conditions of shear such as may be encountered during processing. Whereas typical commercial maleated waxes exhibit viscosities which are essentially shear independent, i.e., complex viscosity (P) remains essentially unchanged as the shear rate (frequency) is varied, the maleated products produced by the process of the invention using distillation residues containing both low and high molecular weight polymer species exhibits shear dependent viscosity.

This is apparent from the dynamic complex viscosity data tabulated below. The rheological data were determined using a Rheometrics ARES rheometer at 130° C. in the parallel plate mode (plate diameter 50 mm). Complex viscosities were determined for a commercial maleated wax and the maleated product of the invention in the frequency sweep mode at frequencies (shear rates) ranging from 2.51 to 398 rad/sec. The commercial wax (EPOLEN C-18P) is a maleic anhydride-modified low molecular weight polyethylene (Acid Number 2; $M_n$ 5700; 150° C. Brookfield viscosity 4000 cP).

|  | Complex Viscosity (P) | |
| --- | --- | --- |
| Shear Rate | Maleated Product of Invention | Maleated Commercial Product |
| 2.51 (low shear) | 127.3 | 71.8 |
| 10 | 81.3 | 68.5 |
| 100 | 31.4 | 67.2 |
| 398 (high shear) | 16.3 | 67 |

The unexpected difference in viscosity response at varying shear rates for the two products is apparent from the above data. The shear dependent viscosity of the maleated product obtained by the process of the invention renders the product highly useful as a coupling/compatibilizing agent for the manufacture of wood plastic composites. Since WPC processes typically are high shear operations, the lower viscosity of the maleated product of the invention at high shear renders it readily compatible with the wood flour filler due to the ease of wettability and facilitates incorporation in the matrix polymer. The high viscosity at low shear, which is evidence of molecular entanglements presumably as a result of the presence of low and high molecular weight polymer species, imparts enhanced mechanical strength to the finished WPC product.

We claim:

1. A process for the maleation of a distillation residue containing 4 to 10 weight percent hydrocarbon diluent, 5 to 20 weight percent polyethylene having a density of 0.940 to 0.955 g/cm$^3$ and melt index according to ASTM D 1238-01, condition 190/2.16 of 0.02 to 0.3 g/10 min, 60 to 90 weight percent polyethylene wax having a number average molecular weight from 100 to 30000 and 0.2 to 1 weight percent catalyst residue, comprising:
  (a) treating the distillation residue to remove hydrocarbon diluent;
  (b) incorporating 1 to 10 weight percent maleic anhydride, based on the weight of the distillation residue;
  (c) incorporating 0.25 to 6 weight percent organic peroxide, based on the weight of the distillation residue;
  (d) heating the mixture above the decomposition temperature of the organic peroxide until the maleic anhydride is reacted; and
  (e) recovering the maleated product.

2. The process of claim 1 wherein the hydrocarbon diluent is hexane.

3. The process of claim 1 wherein (a) is conducted at a temperature in the range 120° C. to 150° C.

4. The process of claim 1 wherein the residue treated in accordance with (a) contains less than 200 ppm hydrocarbon.

5. The process of claim 1 wherein the maleic-anhydride incorporation is carried out in the melt state.

6. The process of claim 5 wherein the amount of maleic anhydride incorporated is from 1.5 to 8 weight percent.

7. The process of claim 1 wherein the organic peroxide incorporation is carried out in the melt state at a temperature below the decomposition temperature of the organic peroxide.

8. The process of claim 7 wherein the amount of the organic peroxide incorporated is from 0.5 to 5 weight percent.

9. The process of claim 1 wherein (d) is conducted at a temperature in the range 103° C. to 200° C.

10. The maleated product produced by the process of claim 1 which contains from 0.5 to 7 weight percent bound maleic anhydride.

11. The maleated product of claim 10 further characterized by having shear dependent viscosity.

12. A process for the maleation of a distillation residue obtained from a process for the polymerization of ethylene, said distillation residue containing 4 to 10 weight percent hydrocarbon diluent, 5 to 20 weight percent polyethylene having a density of 0.940 to 0.955 g/cm$^3$ and melt index according to ASTM D 1238-01, condition 190/2.16 of 0.02 to 0.3 g/10 mm, 60 to 90 weight percent polyethylene waxes having a number average molecular weight from 100 to 30000 and 0.2 to 1 weight percent catalyst residue, comprising:
  (a) heating the distillation residue at a temperature of 120° C. to 150° C. to remove hydrocarbon diluent;
  (b) maintaining the residue obtained from (a) containing less than 200 ppm hydrocarbon diluent in a molten state and incorporating from 1 to 10 weight percent maleic anhydride;
  (c) incorporating 0.25 to 6 weight percent organic peroxide into the melt containing the maleic anhydride from (b) while maintaining the temperature of said melt below the decomposition temperature of the organic peroxide;
  (d) increasing the temperature of the mixture from (c) above the decomposition temperature of the organic peroxide and maintaining until the maleic anhydride is reacted; and
  (e) recovering the maleated product.

* * * * *